Nov. 21, 1933.    S. L. ADELSON    1,936,373
FLUID FLOW CONTROLLER
Filed Oct. 15, 1932    2 Sheets-Sheet 1
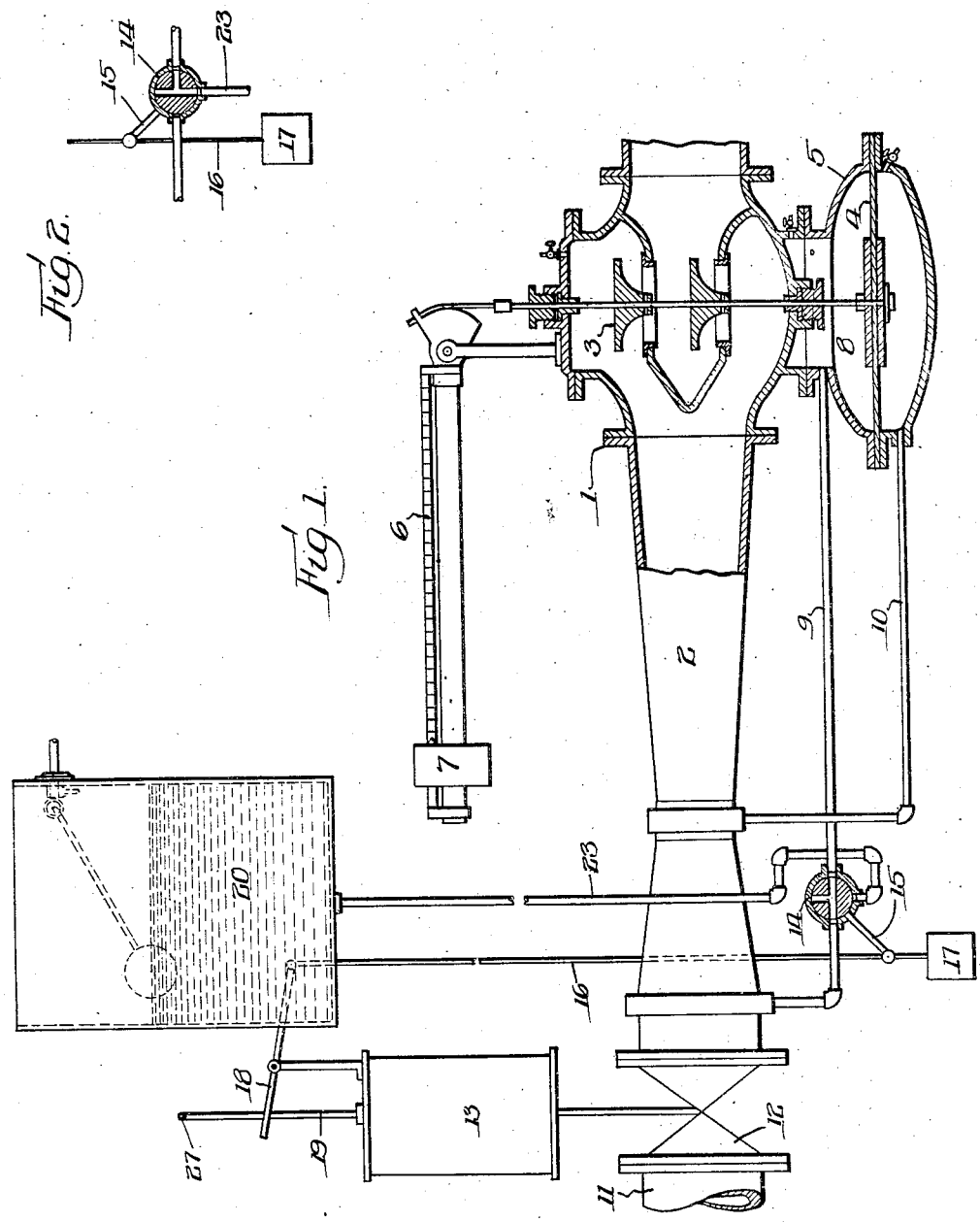
Inventor:
Samuel L. Adelson Nov. 21, 1933.　　　S. L. ADELSON　　　1,936,373
FLUID FLOW CONTROLLER
Filed Oct. 15, 1932　　2 Sheets-Sheet 2
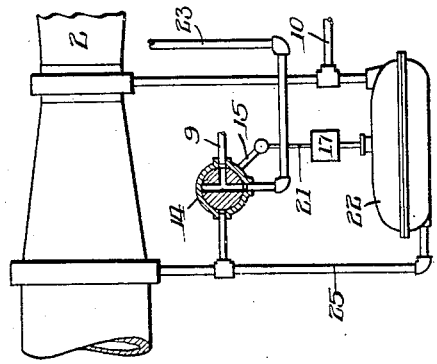
Fig. 4.
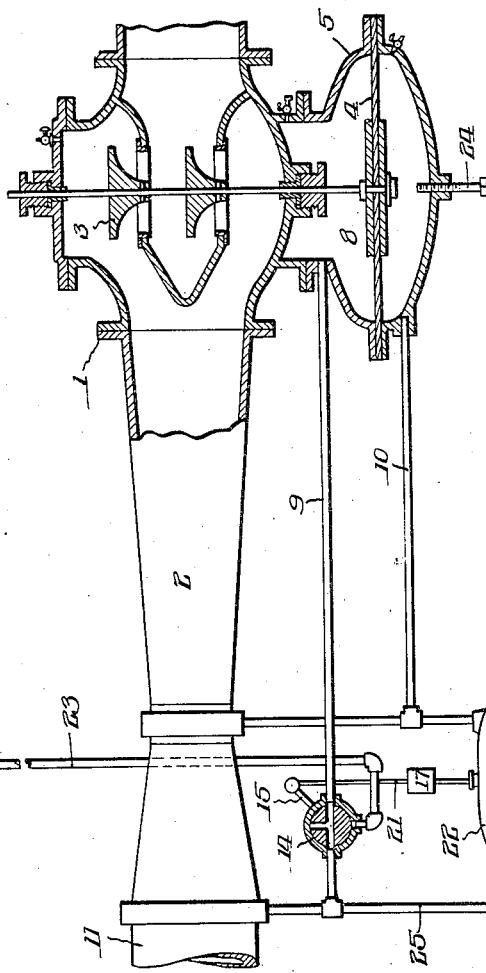
Fig. 3.
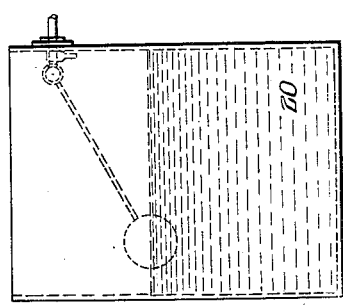
Inventor:
Samuel L. Adelson Patented Nov. 21, 1933

1,936,373

UNITED STATES PATENT OFFICE 1,936,373

FLUID FLOW CONTROLLER

Samuel L. Adelson, Chicago, Ill., assignor to General Zeolite Co., Chicago, Ill., a corporation of Illinois Application October 15, 1932. Serial No. 637,934

13 Claims. (Cl. 137—152.5)

This invention relates to apparatus for controlling the flow of fluids and has for an object to effect certain improvements therein whereby the operation thereof more effectively controls the subject flow with corresponding benefits in the operation of the plant or system of which it forms a part.

Since apparatus of this kind is widely used in connection with water treating plants and particularly with filters such as are used in plants for purifying municipal supplies, I will for purposes of exemplification describe my invention as applied in connection with such a system although of course it may be used elsewhere.

Experience has established the fact that in the operation of such a plant certain flows should be quite closely controlled. Thus for good results during the period of filtration the flow should be held substantially constant and in particular should not fluctuate rapidly, also there is a certain maximum rate that should never be exceeded for if it occurs impurities may be carried deep into or entirely through the filter bed. In a like manner during the backwash, when a rapid reverse flow is passed through the bed to flush out impurities that have been retained there during the filtering cycle, the flow should be confined within limits for if the rate of flow is too great the bed may be disrupted and/or filtering material carried out with the sediment. If, on the other hand, the rate of flow is too low it will be ineffective to loosen and carry out the sediment and consequently the wash water passed at too slow a rate is wasted.

While it is possible to control such flows by hand, this involves constant attention and much manipulation which not alone runs up the labor cost but has proven unsatisfactory. It has been the custom for a great many years to provide a device, commonly called a rate of flow controller, on the effluent line from such filters, such device serving to limit and confine the flow, and more recently it is becoming the practice to put similar devices on the wash water line to similarly control the wash flow. Such rate of flow controllers are well known in the art and they will not be described or illustrated except as may be necessary or desirable to clearly set out my present invention.

The rate of flow controllers in general use today, such as have been found most suitable for the services above outlined, fall into two classes. In both a pressure differential is derived from the flow that is to be regulated, this being commonly but not necessarily by means of a Venturi tube, and this differential is used to regulate the flow. In the one class this differential is applied to a device to operate thereby a pilot switch through which outside power is applied to the regulating valve to position it to effect regulation. In the other class the pressure differential is itself utilized as power to position the regulating valve, being applied to a flexible diaphragm which is directly joined to this valve so that motion of the diaphragm is directly imparted to the valve. It is to this latter class of controllers that the present invention pertains.

The construction of both types is such that they really function to maintain a constant pressure differential to which they have been set and which, because of the relation existing, has the effect of maintaining a constant flow. With both types an increase of differential above that for which the apparatus is set causes the regulating valve to move to close and a decrease causes the valve to move in the opening direction. While this is exactly what is wanted during the period when flow is taking place, it has an undesirable result when the flow is shut off, as occurs periodically in the operation of all such plants. When the flow through the conduit on which the controller is placed is stopped as by the closing of a shutoff valve, the differential drops to zero and consequently the regulating valve opens wide. When the shutoff valve is again opened the regulating valve is wide open and a rush of water takes place, with undesirable results as above referred to, until the regulating valve closes enough to restrict the flow and regulation is resumed. This difficulty would be overcome if the regulating valve were caused to take a closed or partially closed position when the flow ceases or falls to some predetermined minimum.

In previous applications which have resulted in Patents 1,866,284 and 1,870,321, I have proposed means whereby in controllers of the first type employing outside power for regulation, the regulating valve may be caused to wholly or partially close under the conditions referred to. The present invention is directed to securing the same results with controllers of the other or so-called direct acting type. The apparatus set forth in the applications referred to is not directly applicable to this type of controller, although some of the principles now employed are the same or similar to those there disclosed. Because of this and also because the present invention came as a result of carrying further the thought of those inventions and of the work that was done in developing them, this application may be regarded as to some extent a continuation of those applications.

The object of this invention may be broadly stated as directed to providing means associated with or incorporated in a direct acting type controller whereby under predetermined conditions the normal tendency of the regulating valve to open upon decrease of flow may be reversed and it be caused to wholly or partially close.

Another object is to provide such apparatus of simple and effective nature and also of a form such that existing controllers of this type may be incorporated into it and become part of it and so be made to operate in the improved manner.

With these and other objects in view the invention consists in the novel construction used and the combination and arrangement of parts to the desired end.

In the accompanying drawings Fig. 1 is an elevation partly in section of a controller wherein the differential pressure is applied to a diaphragm to directly move the regulating valve, certain parts being added in accordance with my present invention.

Fig. 2 shows the switch valve of Fig. 1 in another position.

Fig. 3 shows an apparatus similar to Fig. 1 but modified in parts.

Fig. 4 shows the switch valve of Fig. 3 in another position.

Referring now to Fig. 1, the numeral 1 denotes generally a controller of common type, comprising the venturi 2, the regulating valve 3 attached to the diaphragm 4 in the casing 5 and to the balance lever 6 on which is mounted the movable weight 7. The upper chamber 8 of the diaphragm casing is connected to the full section piezometer ring of the Venturi tube by the pipe 9 and the lower chamber to the throat ring by the pipe 10. This controller may be located in any conduit 11, the flow through which is to be controlled, as for instance the effluent line from a filter. The valve 12, operated by the hydraulic cylinder 13 serves to shut off the flow through the conduit.

Assuming a suitable supply of water and that valve 12 is open, the flow through 11 will reach such proportion that the moment of the differential acting downward on 4 will overcome the moment of weight 7, closing valve 3 to the point where the pull of the weight and diaphragm are in equilibrium and this flow will thereafter be maintained irrespective of pressure variations in line 11. In other words the setting of weight 7 fixes a differential and thus a flow which the parts cooperate to maintain.

If now the valve 12 be closed the differential will disappear and weight 7 pulls the valve 3 wide open. When valve 12 is thereafter opened there will be a rush of water through the apparatus at what will usually be an objectionable and may be a destructive rate, until control is reestablished as described.

To overcome this difficulty I propose by nullifying or overcoming the moment of weight 7 to cause the valve 3 to wholly or partially close when valve 12 is closed or when for any reason the flow through 11 falls below a predetermined rate. To do this I may insert in the pipe 9 a 3-way valve 14, operated by the lever 15 which is connected by the link 16 on which hangs the weight 17 to the lever 18 which is actuated from the tail rod 19 of the piston in the hydraulic cylinder 13. As shown in Fig. 1 the valve 12 is open and valve 14 is in position to open pipe 9 between the piezometer ring and chamber 8.

When valve 12 is closed the projection 27 which may be adjustable, strikes lever 18 and thus through link 16 and lever 15 throws valve 14 into the position shown in Fig. 2. When in this position valve 14 disconnects chamber 8 from the piezometer ring and connects it to a pipe 23 leading to a supply of water under pressure as tank 20. The higher pressure now exerted in chamber 8 forces the diaphragm 4 down closing valve 3. On reopening valve 12 to reestablish flow through 11, operation of controller 1 starts with valve 3 closed and so a rush of water is prevented.

In some cases the valve 12 may be too remote for operation as so far described or the flow through conduit 11 may come from more than one source or may be led to more than one place of use so that there will be a plurality of valves corresponding to 12. To meet such condition it is desirable to provide mechanism that will be operated independent of the motion of valve 12 and in such cases the apparatus illustrated in Figs. 3 and 4 may be used. The parts of these figures by which ordinary regulation is secured and the operation thereof is the same as in Figs. 1 and 2, the difference lying in the associated parts by which closing is effected on stoppage of flow.

In the form shown in these figures the switch valve 14, instead of being thrown by or upon motion of valve 12 is operated as follows. The lever 15 is connected to the link 21 which is connected to a flexible diaphragm in the diaphragm casing 22. The lower chamber in casing 22 is joined by the pipe 25 to the pipe 9 leading from chamber 8 to the full section piezometer ring and the upper chamber is joined to pipe 10 and thus to the throat piezometer ring. The link 21 is weighted, as by 17, sufficiently to overcome friction and thus move valve 14 but not necessarily more than this. With a normal flow through 11 the parts will be in the position indicated in Fig. 3, the diaphragm in casing 22 being forced upward to sustain weight 17 by the differential across tube 2. If the flow through 11 ceases, the differential disappears and weight 17 will fall moving switch valve 14 into the position shown in Fig. 4 wherein pipe 9 is opened to pipe 23 causing valve 3 to close as previously described. Weight 17 may be made such as to cause valve 3 to close whenever the flow through 11 and thus the differential falls to a desired minimum or it may be made adjustable so as to allow for changing the point of closing action.

If with the form shown in Figs. 3 and 4 and upon operation as above described, the valve 3 was allowed to stop all flow through 11, there would be no way of causing it to open and resume regulating action when flow is again desired and some valve corresponding to 12 were opened, since some flow is required to create a differential to raise lever 15 and throw 14 into proper position. While in some cases it may be desirable to have manual attention necessary for this purpose, this is not ordinarily so. Various means may be used to cause valve 3 to automatically move to open when flow through 11 is again desired. A preferred method and one adapted to the great majority of installations is as follows. An adjustable stop 24 is provided which may be set to prevent complete closing of valve 3 and thus to permit a small initial flow on opening of some valve to permit flow through the line 11. The setting of 24 is such that the initial flow acting on the diaphragm in casing 22 will reverse switch valve 14 returning it to the operating position of Fig. 3.

It will thus be apparent that with my improvements the controller will operate and regulate in the ordinary manner over the normal range of flows but that on closing of an outside valve or the fall of the flow below a predetermined minimum from any cause the effect of weight 7 will be overcome and valve 3 will be moved toward a closed position instead of as heretofore with this type of controller to assume a wide open position.

I claim:

1. Fluid flow controlling mechanism comprising in combination a Venturi tube, a regulating valve, a weight joined to said valve in a manner tending to move it to open position, a diaphragm joined to said valve so as to impart its motion thereto, means for applying to said diaphragm a differential pressure resulting from flow through said Venturi tube in a manner tending to raise said weight and to move said valve toward closed position and additional means for applying force tending to raise said weight upon predetermined conditions of flow.

2. In combination, a conduit for fluid flow, a flow controller on said conduit comprising a regulating valve, a casing, a diaphragm in said casing dividing it into two chambers, said diaphragm being directly connected to said valve so as to impart its motion thereto, a Venturi tube and pipes for conveying differential pressures from said tube to said chambers and a device operative when the flow falls below a predetermined limit for altering the fluid pressure in one of said chambers to a pressure unrelated to the flow.

3. In combination, a fluid flow controller comprising a regulating valve, a weight attached to said valve and tending to move it to open position, a diaphragm so attached to said valve as to impart its motion thereto, a pressure differential creating device, and means for applying the pressure differential on said diaphragm in a manner to oppose the action of said weight; and means operative upon predetermined flow conditions to apply other power tending to overcome the action of said weight.

4. Fluid flow controlling mechanism comprising in combination a Venutri tube, a regulating valve, a weight joined to said valve in a manner so that it tends to move the valve to open position, a diaphragm so joined to said valve as to impart its motion thereto, means for applying to said diaphragm a pressure differential resulting from flow through said Venturi tube in a manner tending to move said valve toward closed position and additional means operative upon predetermined conditions for causing the force tending to close said valve to exceed the force tending to open it.

5. In combination, a conduit, a shutoff valve on said conduit, a fluid flow controller on said conduit comprising a regulating valve, a weight attached to said valve in a manner tending to move it to open position, a diaphragm so attached to said valve as to impart its motion thereto, a pressure differential creating device and means to make the differential pressure effective on said diaphragm in opposition to said weight; and means operated from said shutoff valve for applying other power tending to overcome the action of said weight.

6. In combination a rate controller for fluid flow comprising a regulating valve, a diaphragm connected thereto to impart regulating motion to the valve, a device for deriving a differential pressure from the flow, means for applying said differential pressure to said diaphragm and means operative upon decrease of the flow below a predetermined minimum for changing the pressure applied on one side of the diaphragm to a pressure unrelated to the flow.

7. In combination a conduit for fluid flow, means for deriving a differential pressure from the flow, a diaphragm, means for applying said differential pressure to said diaphragm, a regulating valve upon said conduit, said regulating valve being directly united to said diaphragm to be moved thereby upon changes of the pressure effective on the diaphragm and means for changing the effective pressure on the diaphragm upon decrease of said flow below a predetermined minimum so as to cause closing motion of said regulating valve.

8. In combination a conduit for fluid flow, a shutoff valve upon said conduit, a regulating valve upon said conduit, a diaphragm so united with said regulating valve as to impart its motion thereto, means for deriving a pressure differential from the flow through the conduit, means for communicating said pressure differential to said diaphragm, and means operative upon closing motion of said shutoff valve to cut off the said pressure differential and substitute therefor another pressure tending to move said diaphragm in the direction to close said regulating valve.

9. Apparatus for controlling the flow of fluid through a conduit comprising in combination a regulating valve on said conduit, a diaphragm so joined to said valve that the motion of the diaphragm is imparted to the valve, means for applying to said diaphragm a pressure functional to flow through the conduit and means effective upon decrease of the functional pressure below a predetermined limit to substitute therefor upon said diaphragm another pressure to cause said diaphragm to move said regulating valve in closing direction.

10. In combination, a conduit, a shutoff valve on said conduit, a regulating valve on said conduit, a casing, a diaphragm in said casing dividing it into two chambers, said diaphragm being so joined to said valve as to directly impart its motion thereto, a Venturi tube forming part of said conduit, a pipe joining one of said chambers to one point on said tube, a second pipe joining the other chamber to another point on said tube, a switch valve on one of said pipes, another pipe joining said switch valve to a source of fluid under pressure, and a connection joining said switch valve to said shutoff valve in a manner such that the former will be actuated when the latter is opened or closed.

11. In combination, a conduit for fluid flow, a regulating valve upon said conduit, a pressure differential device upon said conduit, a casing, a diaphragm in said casing dividing it into two chambers, said diaphragm being joined to said valve so as to impart its motion thereto, a pipe joining one of said chambers to a point on said pressure differential device, another pipe joining the other chamber to a different point on said device, a switch valve on one of said pipes, a second diaphragm joined to said switch valve, and conduits serving to transmit differential pressure taken from the flow to the two sides of said second diaphragm.

12. In combination, a conduit, a shutoff valve on said conduit, a fluid flow controller on said conduit comprising a regulating valve, a weight joined to said valve in a manner tending to move it in one direction, a diaphragm so joined to said valve as to impart its motion thereto, a pressure differential creating device and means to make the differential pressure effective on said diaphragm in opposition to said weight; and means operated from said shutoff valve for applying other power to overcome the action of said weight.

13. In combination, a conduit, a shut-off valve on said conduit, a flow controller on said conduit comprising a regulating valve, a weight joined to said valve in a manner tending to move it in one direction, a diaphragm so joined to said valve as to impart its motion thereto, a pressure differential creating device and means to make the differential pressure effective on said diaphragm in opposition to said weight; and additional means effective under predetermined conditions for impressing another pressure on the diaphragm.

SAMUEL L. ADELSON.